US011922855B2

(12) United States Patent
Chang et al.

(10) Patent No.: US 11,922,855 B2
(45) Date of Patent: Mar. 5, 2024

(54) CHANGING LCD DISPLAY TIMING CONTROLLER SETTINGS FOR DIFFERENT GRAPHICS PROCESSOR REQUIREMENTS

(71) Applicant: Dell Products L.P., Round Rock, TX (US)

(72) Inventors: Chun-Yi Chang, Taipei (TW); Yi-Fan Wang, Taipei (TW); Meng-Feng Hung, Taoyuan (TW); No-Hua Chuang, Taipei (TW); Yu Sheng Chang, Taishan District (TW)

(73) Assignee: Dell Products L.P., Round Rock, TX (US)

( * ) Notice: Subject to any disclaimer, the term of this patent is extended or adjusted under 35 U.S.C. 154(b) by 230 days.

(21) Appl. No.: 17/589,496

(22) Filed: Jan. 31, 2022

(65) Prior Publication Data

US 2023/0245613 A1 Aug. 3, 2023

(51) Int. Cl.
*G09G 3/20* (2006.01)
*G09G 3/36* (2006.01)

(52) U.S. Cl.
CPC ............. *G09G 3/2096* (2013.01); *G09G 3/36* (2013.01); *G09G 2310/08* (2013.01); *G09G 2360/06* (2013.01); *G09G 2360/12* (2013.01); *G09G 2370/04* (2013.01)

(58) Field of Classification Search
None
See application file for complete search history.

(56) References Cited

U.S. PATENT DOCUMENTS

| | | | | |
|---|---|---|---|---|
| 10,997,687 | B1 * | 5/2021 | Guerra | G09G 5/10 |
| 2012/0154375 | A1 * | 6/2012 | Zhang | G06F 9/4411 345/522 |
| 2016/0343320 | A1 * | 11/2016 | Tann | G09G 3/3618 |
| 2019/0392781 | A1 * | 12/2019 | Hsu | G09G 5/363 |

* cited by examiner

*Primary Examiner* — Sarah Le
(74) *Attorney, Agent, or Firm* — Larson Newman, LLP

(57) ABSTRACT

An information handling system includes a host processing system and a Liquid Crystal Display device. The host processing system includes a graphics processing unit (GPU) and the LCD device includes a memory device and a DisplayPort Configuration Data (DPCD) register. The host processing system 1) determines whether the first GPU supports a Dynamic Display Shifting (DDS) mode, 2) when the GPU does not support the DDS mode, provides a first indication to the LCD device that the GPU does not support the DDS mode, and 3) when the GPU supports the DDS mode, provides a second indication to the LCD device that the GPU supports the DDS mode. The LCD device retrieves a Panel Self Refresh (PSR) setting from the memory device and stores the PSR setting to the DPCD register in response to the first indication, and retrieves a DDS setting from the memory and stores the DDS setting to the DPCD register in response to the second indication.

20 Claims, 4 Drawing Sheets

CHANGING LCD DISPLAY TIMING CONTROLLER SETTINGS FOR DIFFERENT GRAPHICS PROCESSOR REQUIREMENTS

FIELD OF THE DISCLOSURE

This disclosure generally relates to information handling systems, and more particularly relates to changing LCD display timing controller (TCON) settings for different graphics processor (GPU) requirements.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a host processing system and a Liquid Crystal Display device. The host processing system may include a graphics processing unit (GPU) and the LCD device may include a memory device and a DisplayPort Configuration Data (DPCD) register. The host processing system may 1) determine whether the first GPU supports a Dynamic Display Shifting (DDS) mode, 2) when the GPU does not support the DDS mode, provide a first indication to the LCD device that the GPU does not support the DDS mode, and 3) when the GPU supports the DDS mode, provide a second indication to the LCD device that the GPU supports the DDS mode. The LCD device may retrieve a Panel Self Refresh (PSR) setting from the memory device and store the PSR setting to the DPCD register in response to the first indication, and may retrieve a DDS setting from the memory and store the DDS setting to the DPCD register in response to the second indication.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
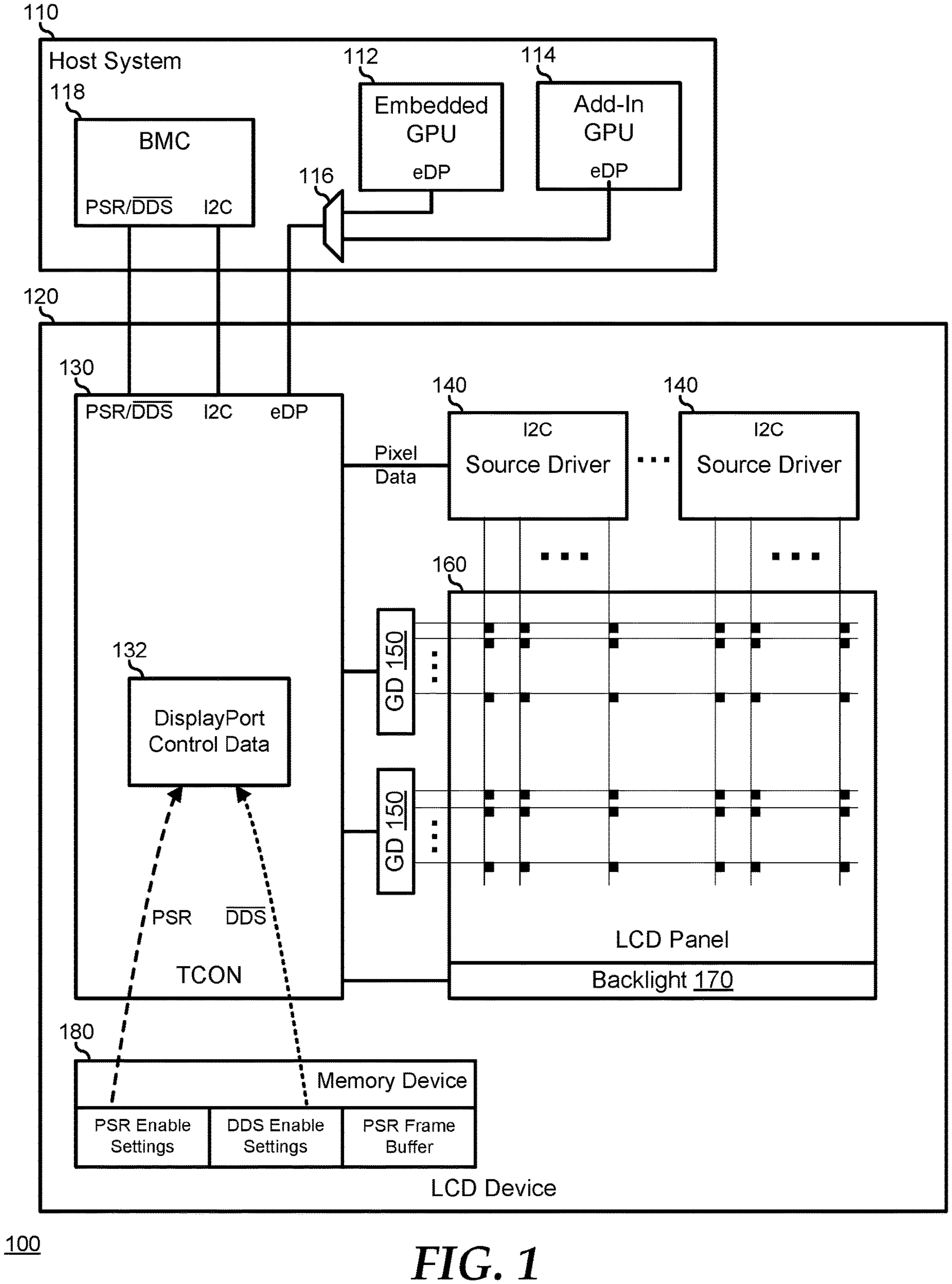
FIG. 1 is a block diagram of an information handling system according to an embodiment of the current disclosure.

FIG. 1 illustrates an information handling system 100, including a host processing system 110 and a Liquid Crystal Display (LCD) device 120. Information handling system 100 represents a computing device that presents image data on LCD device 120. In particular, information handling system 100 may represent a general computing device with an integrated LCD device, such as a laptop computer system, a tablet or notebook system, a cellular device, or the like, or the information handling system may represent a display device whose purpose is to present image date for another computing device, such as a stand-alone monitor or display system. Where information handling system 100 represents such a stand-alone monitor or display system, the information handling system will be understood to receive image data from an external source, such as a HDMI cable connected to a source device, and the information handling system will be understood to include a substantial degree of intelligence as represented by host processing system 110.

Host processing system 110 represents a processing system, including processing hardware, software, firmware, and the like, to perform the functions and features of information handling system 100. Where information handling system 100 represents a full-featured general computing device, the functions and features of host processing system 110 will represent a fully functional operating environment for the execution of programs and code to perform user-desired function. On the other hand, where information handling system 100 represents a display device, the functions and features of host processing system 110 will represent a more limited functionality sufficient to monitor, manage, maintain, and operate in its capacity as a display device.

Host processing system 110 includes an integrated graphics processing unit (GPU) 112, an add-in GPU 114, an embedded DisplayPort (eDP) multiplexor 116, and a baseboard management controller (BMC) 118. GPUs 112 and 114 represents coprocessors of host processing system 110, and may represent full featured GPUs that perform advanced 3-D rendering, shading, other image processing functions or the like, or may represent more modest GPUs that receive data from a computer in a first format, for example in a HDMI format, and render the received data in another format, such as an eDP format for use by LCD device 120. Integrated GPU 112 represents a GPU that is integrated into host processing system 110, such as where a processor includes an integrated GPU. Add-in GPU 114 represents a GPU that is added to host processing system 110, for example as an added device on a main board of the system or as add-in card in an add-in slot. In this regard, integrated GPU 112 may represent a GPU with limited video processing capabilities or lower performance levels, while add-in GPU 114 may represent a GPU with enhanced video processing capabilities or higher performance levels. Here, it may be understood that integrated GPU 112 consumes less power when operating than add-in GPU 114 because of the more basic video processing or the lower performance level.

In a particular embodiment, GPUs 112 and 114 operate in conjunction, such as where various video processing tasks are first performed by integrated GPU 112, and the pre-processed video information is passed to add-in GPU 114 which performs additional video processing tasks prior to transmission of final video information to LCD device 120. Integrated GPU 112 and add-in GPU 114 are connected together by a data communication interface (not illustrated) for passing the pre-processed video information from the integrated GPU to the add-in GPU. eDP multiplexor 116 may be configured to connect the eDP output from add-in GPU 114 to an eDP input of LCD device 120. In another embodiment, host processing system 110 operates to select one of integrated GPU 112 or add-in GPU 114 to process video information, while the unselected GPU is shut down or otherwise halted from operating. Host processing system 110 may operate to determine an operating mode of information handling system 100, and select between integrated GPU 112 and add-in GPU 114 based upon the determined operating mode.

For example, where information handling system 100 represents a laptop computer, a determination may be made that the laptop computer is operating in a battery powered mode, and may select integrated GPU 112 to provide processed video information to LCD device 120 due to the lower power draw from the integrated GPU, thereby optimizing the operation of the information handling system for longer battery life. In another example, a determination may be made that the laptop computer is plugged in to an AC outlet, and a user of the laptop computer is running a game application or streaming content. Host processing system 110 may select add-in GPU 114 to provide processed video information to LCD device 120 due to the higher performance capabilities of the add-in GPU, thereby optimizing the operation of information handling system 100 for greater video performance. In either case, once a particular one of integrated GPU 112 or add-in GPU 114 is selected, host processing system 110 directs eDP multiplexor 116 to connect the appropriate eDP output to the eDP input of LCD device 120.

Manufacturers of information handling systems such as information handling system 100 typically include add-in GPUs in their systems that are provided from a variety of GPU manufacturers. For example, a laptop computer may be sourced with one of a group of GPUs that may be manufactured into the laptop computer to satisfy the individual desires of the users who purchase the laptop computer. As such, add-in GPUs may be provided by Nvidia, AMD, Intel, or other manufacturers of add-in GPUs. It has been understood by the inventors of the current disclosure, that the various GPUs may implement different schemes for switching between the integrated GPU and the add-in GPU by an eDP multiplexor. For example, where an add-in GPU is manufactured by Nvidia, the laptop computer may be required to implement a Dynamic Display Shifting (DDS) function, also known as the Nvidia Advanced Optimus function, to properly switch between the integrated GPU and the add-in GPU.

In another example, where an add-in GPU is manufactured by AMD, the laptop computer may be required to implement a SmartMUX function to properly switch between the integrated GPU and the add-in GPU. In yet another example, where an add-in GPU is manufactured by Intel, the laptop computer may be required to implement a Display Shift function to properly switch between the integrated GPU and the add-in GPU. The details of Display Shifting in general, and particularly of the DDS function, the SmartMUX function, and the Display Shift function are known in the art, and will not be further described herein except as needed to illustrate the current embodiments.

BMC 118 represents one or more processing devices, such as a dedicated BMC System-on-a-Chip (SoC) device, one or more associated memory devices, one or more network interface devices, a complex programmable logic device (CPLD), and the like, that operate together to provide the management environment for information handling system 100, as described further below. The operations of host processing systems, GPUs, and the like are known in the art and will not be further describe herein, except as needed to illustrate the current embodiments.

LCD device 120 represents an integrated device that is configured to receive image data and to convert the image data into the image displayed on the LCD device. As such, LCD device 120 includes a timing controller 130, one or more source drivers 140, one or more gate drivers 150, a LCD panel 160, a backlight 170, and a non-volatile memory device 180. Timing controller 130 represents a device that operates to receive the image data from GPU 112, for example from an eDP input, and to control the operations of source drivers 140, gate drivers 150, and backlight 170 to provide an image on LCD panel 160. In particular, timing controller 130 operates to translate the image data into pixel data that is transmitted to source drivers 140, to control gate drivers 150 to clock the pixel data to the appropriate pixels of panel 160, and to control image quality and contrast by driving backlight 170 to various brightness levels, as needed or desired.

As such timing controller 130 operates to control image aspects such as color, contrast, brightness, image refresh rate, and the like. Timing controller 130 includes a memory device to store DisplayPort Configuration Data (DPCD) 132, and an Inter-Integrated Circuit (I2C) interface connected to an I2C bus that is also connected to I2C interfaces of BMC 118 and source drivers 140. The I2C interfaces and I2C bus may be understood to represent any of a number of different simple device interfaces, such as a System Management Bus (SMB), a Serial Peripheral Interconnect (SPI) interface, a Low Pin Count (LPC) interface, or the like. DPCD 132 will be described further below. Timing controller 130 may represent a single integrated circuit device or a printed circuit board (PCB) including one or more integrated circuit device and other devices as needed or desired. The details of timing controllers design, manufacture, and implementation, source drivers, gate drivers, LCD panels and backlights are known in the art and will not be further described herein, except as needed to illustrate the current embodiments.

In a normal operating mode, the selected one of integrated GPU 112 and add-in GPU 114 provides video information to the LCD panel via the eDP link in accordance with a selected frame refresh rate, or frame rate. For example, where the frame rate is 60 Hz, the selected GPU will process video information and refresh the content of a frame buffer memory, and send the contents of the frame buffer to LCD panel 120 sixty (60) times per second. LCD device 120 then updates the image displayed on LDC panel 160 each time the contents of the frame buffer are received (for example sixty (60) times per second). This repeated transmission of video data from the frame buffer to LCD device 120 is typically performed regardless of whether or not the contents of the frame buffer changes from one cycle to the next, that is, regardless of whether or not the displayed image is changing from one cycle to the next.

Thus, in the normal operating mode, when the contents of the frame buffer change from one cycle to the next, the operations performed by the selected GPU to refresh the frame buffer are necessary to maintain the desired image quality. However when the contents of the frame buffer do not change from one cycle to the next, that is the image is static, the operations performed by the selected GPU to refresh the frame buffer are an unnecessary overhead. In particular, where information handling system 100 is sensitive to power draw, such as in a laptop computer, the constant refreshing of the contents of the frame buffer for static image content represents an unnecessary power draw.

To alleviate this problem, LCD device 120 implements a Panel Self Refresh (PSR) function. In a PSR mode, when the image content is static, the selected GPU sends the contents of the static image from the frame buffer one time, and then performs no further video processing until the contents of the displayed image changes, thereby reducing the power consumed by host processing system 110. When LCD panel 120 receives the contents of the frame buffer, TCON 130 operates to store the received contents of the frame buffer in a PSR frame buffer portion of memory device 180. Then, at the selected frame rate, TCON 130 retrieves the contents of the PSR frame buffer to drive LCD panel 160. In another embodiment, when LCD device 120 is directed to operate in PSR mode, TCON 130 directs source drivers 140 to maintain the pixel data on LCD panel 160 as needed or desired to maintain the static image on the LCD panel. The details of operation in a PSR mode within a host processing system and within a LCD device are known in the art and will not be further described herein, except as needed to illustrate the current embodiments.

It has been understood by the inventors of the current disclosure that in implementing the switching functions of eDP multiplexor 116, the various manufacturers of add-in GPUs may have differing operational requirements for LCD devices, as it relates to the PSR functionality. For example, in implementing the AMD SmartMUX function or the Intel Display Shift function, a LCD device is required to have the PSR mode enabled. On the other hand, in implementing the Nvidia DDS function, the LCD device is required to have the PSR mode disabled. On the other hand, manufacturers of information handling systems, desire to have the maximum amount of flexibility to manufacture a information handling systems with options for a wide range of add-in GPUs to satisfy a wide range of customer demands.

In a particular embodiment, when information handling system 100 is powered on, a Basic Input/Output System (BIOS) or Unified Extensible Firmware Interface (UEFI) may operate at a first time to detect the presence of an integrated GPU, and, when a driver for LCD device 120 is initialized, the BIOS/UEFI can direct LCD device 120 to enable the PSR mode. Then, when the BIOS/UEFI detects an add-in GPU that implements the AMD SmartMUX function or the Intel Display Shift function, the LCD device is correctly set up to implement the switching function as needed or desired. On the other hand, when the BIOS/UEFI detects an add-in GPU that implements the Nvidia DDS function, the BIOS/UEFI operates to re-initialize the LCD device driver to disable the PSR mode. Such a re-initialization may involve the rebooting of LCD device 120, as needed of desired.

In another embodiment, when BMC 118 is powered on, the BMC operates to detect the elements included on information handling system 100, including integrated GPU 112, add-in GPU 114, eDP multiplexor 116, and LCD device 120. Here, it will be understood that BMC 118 may be connected to integrated GPU 112, add-in GPU 114, and eDP multiplexor 116 via a data communication interface, such as an I2C interface or the like, as needed or desired. In this regard, BMC 118 determines whether add-in GPU 114 implements the SmartMUX function, the Display Shift function, or the DDS function, and provides information to LCD device 120 as to which switching function is implemented on the add-in GPU. As such, BMC 118 is illustrated as being connected to TCON 130 via a PSR/$\overline{\text{DDS}}$ signal. When BMC 118 detects that add-in GPU 114 implements the SmartMUX function or the Display Shift function, the BMC asserts the PSR/$\overline{\text{DDS}}$ signal to TCON 130, and the TCON retrieves PSR enable settings from memory device 180, and writes the PSR enable settings to DPCD 132, as illustrated by the dashed line.

On the other hand, when BMC 118 detects that add-in GPU 114 implements the DDS function, the BMC de-asserts the PSR/$\overline{\text{DDS}}$ signal to TCON 130, and the TCON retrieves DDS enable settings from memory device 180, and writes the DDS enable settings to DPCD 132, as illustrated by the dotted line. The PSR/$\overline{\text{DDS}}$ signal may be implemented as a discrete signal line in an existing data communication link between host processing system 110 and LCD device 120. For example, the PSR/$\overline{\text{DDS}}$ signal may be provided as a signal on a previously not connected (NC) pin, such as pin #35 of an eDP connector cable. BMC 118 may drive the signal pin directly, or may provide an output signal to a logic device, such as a Complex Programmable Logic Device (CPLD), that provides a General Purpose I/O (GPIO) dedicated to the PSR/$\overline{\text{DDS}}$ signal, as needed or desired. In another example, the PSR/$\overline{\text{DDS}}$ signal may be communicated over a data communication interface, such as the I2C interface, as needed or desired.

Figure 2:
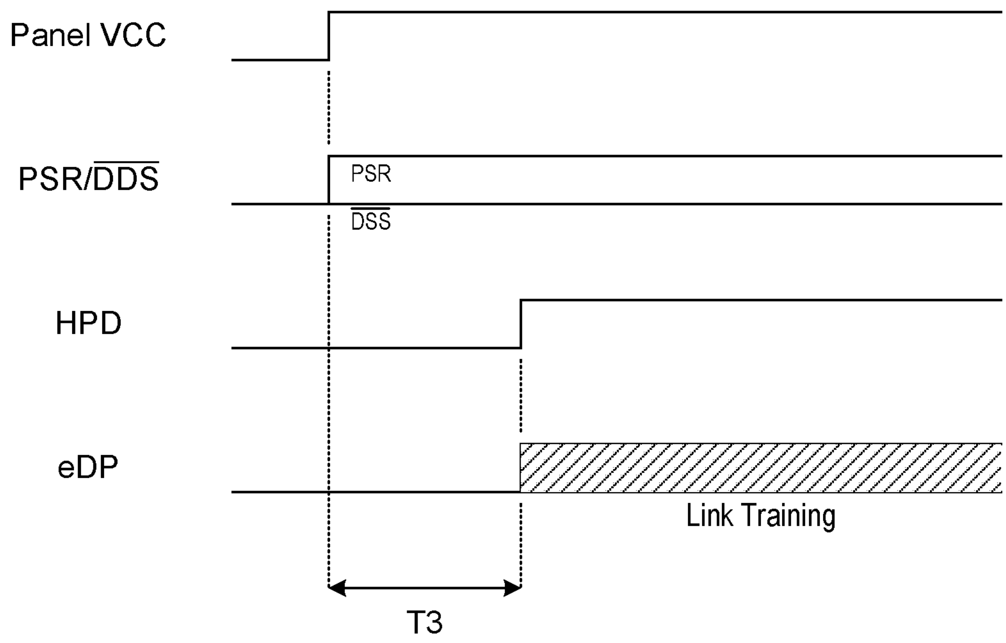
FIG. 2 is a timing diagram illustrating the changing of LCD display timing controller (TCON) settings for different graphics processor (GPU) requirements according to an embodiment of the current disclosure.

FIG. 2 illustrates a boot up timing diagram for an information handling system similar to information handling system 100. Here, a host processing system provides power (Panel VCC) to a LCD device at the same time that a PSR/$\overline{\text{DDS}}$ signal is asserted to the LCD device. The LCD device will typically specify a time duration (T3) after the assertion of the Panel VCC during which the LCD device performs various operations in response to the power-up of the LCD device. In this time duration (T3), the LCD device will be understood to retrieve either the PSR enable settings or the DDS enable settings from a memory device of the LCD device, and to store the retrieved settings to a DPCD of the TCON. The processes and procedures associated with powering on a LCD device during the time duration (T3) are known in the art, and will not be further described herein, except as needed to illustrate the current embodiments. After the processes and procedures associated with powering on the LCD device are completed, the LCD device asserts a Hot Plug Detect (HPD) signal to the host processing system, and the host processing system initiates an eDP link training procedure to complete the initialization of the LCD device.

Figure 3:
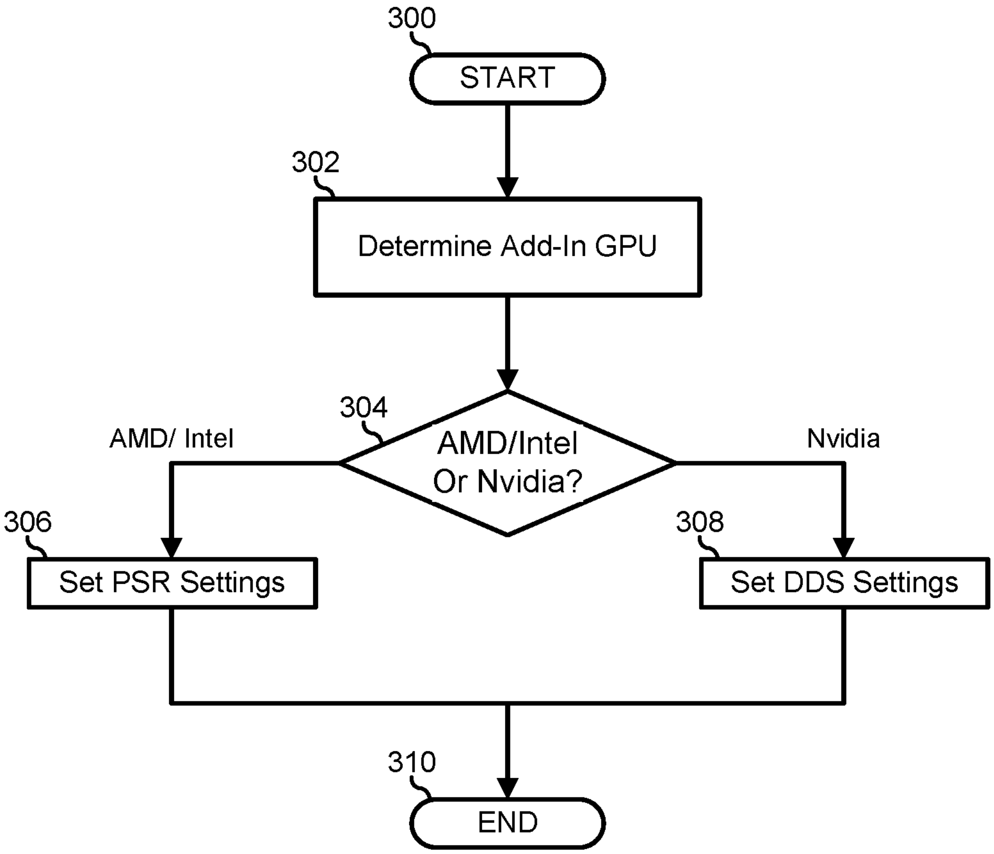
FIG. 3 is a flowchart illustrating a method for changing LCD display TCON settings for different GPU requirements according to an embodiment of the current disclosure.

FIG. 3 illustrates a method for changing LCD display timing controller (TCON) settings for different graphics processor (GPU) requirements starting at block 300. A type for an add-in GPU in an information handling system is determined in block 302. A decision is made as to whether the GPU type is an AMD or Intel type GPU or a Nvidia type GPU in decision block 304. If the GPU is an AMD or Intel type GPU, the "AMD/Intel" branch of decision block 304 is taken, a LCD device is set up with PSR settings in block 306, and the method ends in block 310. If the GPU is an Nvida type GPU, the "Nvidia" branch of decision block 304 is taken, a LCD device is set up with DDS settings in block 308, and the method ends in block 310.

Figure 4:
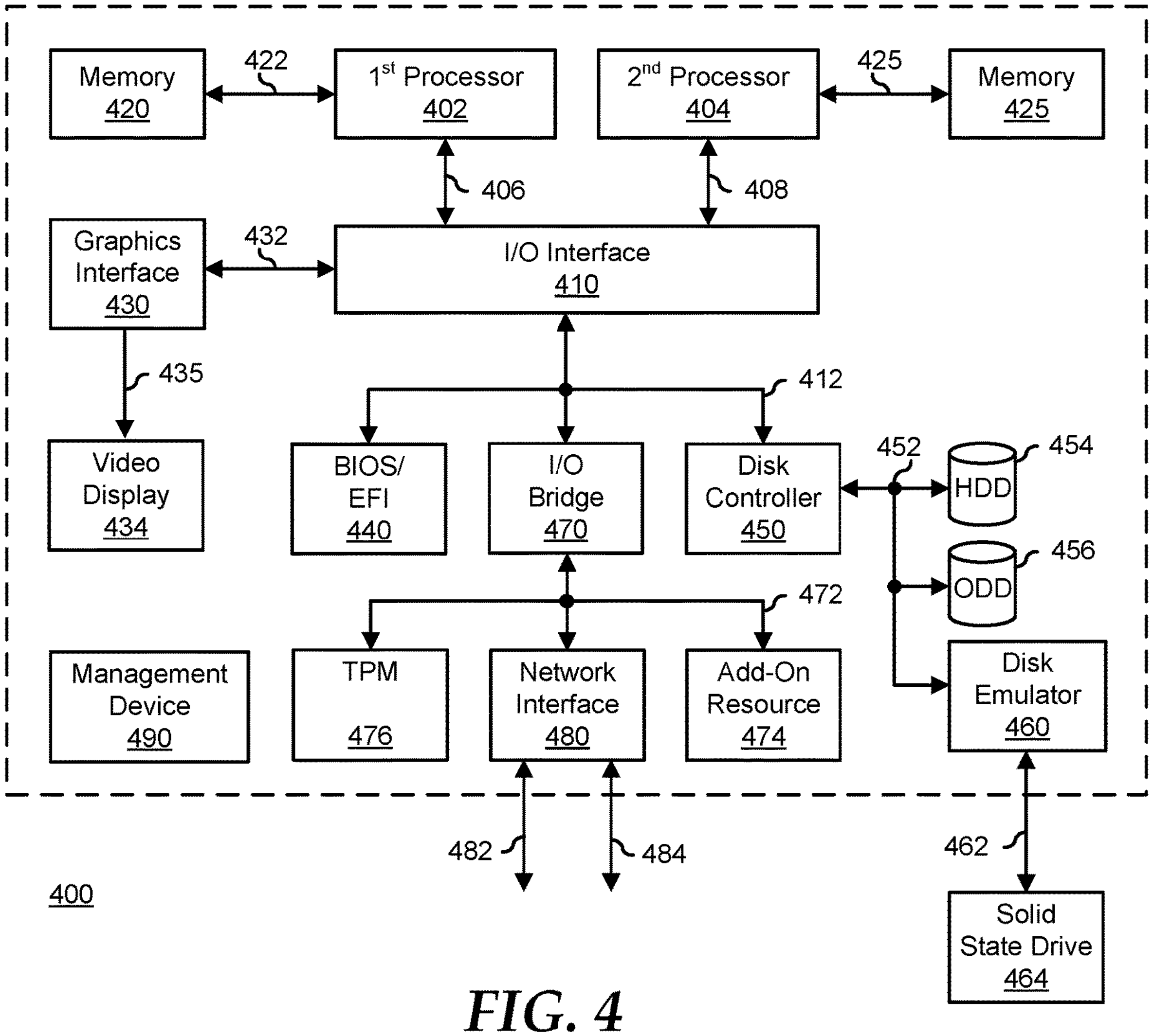
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 436 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:

a host processing system including a first graphics processing unit (GPU); and a Liquid Crystal Display (LCD) device including a memory device and a DisplayPort Configuration Data (DPCD) register;

wherein the host processing system is configured 1) to determine whether the first GPU supports a Dynamic Display Shifting (DDS) mode, 2) when the first GPU does not support the DDS mode, to provide a first indication to the LCD device that the first GPU does not support the DDS mode, and 3) when the first GPU supports the DDS mode, to provide a second indication to the LCD device that the first GPU supports the DDS mode; and wherein the LCD device is configured to retrieve a Panel Self Refresh (PSR) setting from the memory device and store the PSR setting to the DPCD register in response to the first indication, and to retrieve a DDS setting from the memory and store the DDS setting to the DPCD register in response to the second indication.

2. The information handling system of claim 1, wherein the host processing system further includes a Baseboard Management Controller (BMC).

3. The information handling system of claim 2, wherein the BMC makes the determination whether the first GPU supports the DDS mode, and provides the first and second indications.

4. The information handling system of claim 1, wherein the first and second indications are provided via a signal line in a data communication link between the host processing system and the LCD device.

5. The information handling system of claim 4, wherein the data communication link includes an Embedded DisplayPort link.

6. The information handling system of claim 1, wherein the first and second indications are provided via an Inter-Integrated Circuit interface.

7. The information handling system of claim 1, wherein the host processing system further includes a second GPU.

8. The information handling system of claim 7, wherein the first GPU is an add-in GPU, and the second GPU is an embedded GPU.

9. The information handling system of claim 7, wherein the host processing system further includes a multiplexor configured to couple as selected one of a first output from the first GPU and a second output from the second GPU to the LCD device.

10. The information handling system of claim 1, wherein the LCD device further includes a timing controller device, and wherein the timing controller device retrieves the PSR setting and the DDS setting, and stores the PSR setting and the DDS setting to the DPCD register.

11. A method, comprising:

determining, by a host processing system of an information handling system, whether a first graphics processing unit (GPU) of the host processing system supports a Dynamic Display Shifting (DDS) mode;

providing, when the first GPU does not support the DDS mode, a first indication to a Liquid Crystal Display (LCD) device of the information handling system that the first GPU does not support the DDS mode;

retrieving a Panel Self Refresh (PSR) setting from a memory device of the LCD device in response to the first indication;

storing the PSR setting to a DisplayPort Configuration Data (DPCD) register of the LCD device;

providing, when the first GPU supports the DDS mode, a second indication to the LCD device that the first GPU supports the DDS mode;

retrieving a DDS setting from the memory device in response to the second indication; and storing the DDS setting to the DPCD register.

12. The method of claim 11, wherein the host processing system includes a Baseboard Management Controller (BMC).

13. The method of claim 12, wherein the BMC makes the determination whether the first GPU supports the DDS mode, and provides the first and second indications.

14. The method of claim 11, wherein the first and second indications are provided via a signal line in a data communication link between the host processing system and the LCD device.

15. The method of claim 14, wherein the data communication link includes an Embedded DisplayPort link.

16. The method of claim 11, wherein the first and second indications are provided via an Inter-Integrated Circuit interface.

17. The method of claim 11, wherein the host processing system further includes a second GPU, and wherein the first GPU is an add-in GPU, and the second GPU is an embedded GPU.

18. The method of claim 17, wherein the host processing system further includes a multiplexor configured to couple as selected one of a first output from the first GPU and a second output from the second GPU to the LCD device.

19. The method of claim 11, wherein the LCD device further includes a timing controller device, and wherein the timing controller device retrieves the PSR setting and the DDS setting, and stores the PSR setting and the DDS setting to the DPCD register.

20. An information handling system, comprising:

a host processing system including a first graphics processing unit (GPU), a second GPU, and a Baseboard Management Controller (BMC); and a Liquid Crystal Display (LCD) device including a memory device and a DisplayPort Configuration Data (DPCD) register;

wherein the BMC is configured 1) to determine that the first GPU is an embedded GPU and that the second GPU is an add-in GPU, 2) if the second GPU does not support a Dynamic Display Shifting (DDS) mode, then to provide a first indication to the LCD device that the second GPU does not support the DDS mode, and 3) if the second GPU supports the DDS mode, then to provide a second indication to the LCD device that the second GPU supports the DDS mode; and wherein the LCD device is configured to retrieve a Panel Self Refresh (PSR) setting from the memory device and store the PSR setting to the DPCD register in response to the first indication, and to retrieve a DDS setting from the memory and store the DDS setting to the DPCD register in response to the second indication.

* * * * *